(12) United States Patent
Iwamoto

(10) Patent No.: US 12,446,121 B2
(45) Date of Patent: Oct. 14, 2025

(54) HEATING COOKING APPARATUS

(71) Applicant: SHARP KABUSHIKI KAISHA, Sakai (JP)

(72) Inventor: Masayuki Iwamoto, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 895 days.

(21) Appl. No.: 17/631,388

(22) PCT Filed: Jul. 28, 2020

(86) PCT No.: PCT/JP2020/028883
§ 371 (c)(1),
(2) Date: Jan. 28, 2022

(87) PCT Pub. No.: WO2021/020389
PCT Pub. Date: Feb. 4, 2021

(65) Prior Publication Data
US 2022/0330394 A1    Oct. 13, 2022

(30) Foreign Application Priority Data
Jul. 31, 2019   (JP) .................................. 2019-141445

(51) Int. Cl.
*H05B 6/64* (2006.01)
*F24C 15/32* (2006.01)
*H05B 6/68* (2006.01)

(52) U.S. Cl.
CPC ......... *H05B 6/6473* (2013.01); *F24C 15/325* (2013.01)

(58) Field of Classification Search
CPC ............ C23C 16/4404; C23C 16/4405; C23C 16/4581; C23C 16/0227; Y10S 438/906;
(Continued)

(56) References Cited

U.S. PATENT DOCUMENTS 7,928,350 B2 * 4/2011 Yoshino ................ H05B 6/707
219/757
8,253,084 B2   8/2012 Toyoda et al.
(Continued)

FOREIGN PATENT DOCUMENTS

CN    104613512 A    5/2015
CN    106678896 A    5/2017
(Continued)

OTHER PUBLICATIONS

Third Party Observation concerning the International Application No. PCT/JP2020/028883 mailed on Jul. 8, 2021.

*Primary Examiner* — Quang T Van
(74) *Attorney, Agent, or Firm* — ScienBiziP, P.C.

(57) ABSTRACT

A heating cooking apparatus includes a heating cooking chamber, a microwave supply unit, and a first heater. The heating cooking chamber includes an accommodation space that accommodates an object to be heated. The microwave supply unit includes a radiation port and supplies microwaves from the radiation port to the heating cooking chamber. The first heater is positioned in the heating cooking chamber and heats the object to be heated. The first heater and the radiation port are positioned in a predetermined direction with respect to the accommodation space.

1 Claim, 14 Drawing Sheets

(58) Field of Classification Search
CPC ... F24C 15/325; H05B 6/6473; H05B 6/6485; H05B 6/745
USPC ....... 219/678, 679, 680, 681, 682, 683, 684, 219/685, 690, 695, 697, 725, 756, 757, 219/710, 748, 749, 751
See application file for complete search history.

(56) References Cited

U.S. PATENT DOCUMENTS

| | | |
|---|---|---|
| 2010/0133263 A1 | 6/2010 | Toyoda et al. |
| 2012/0187115 A1 | 7/2012 | Toyoda et al. |
| 2012/0192725 A1 | 8/2012 | Toyoda et al. |

FOREIGN PATENT DOCUMENTS

| | | |
|---|---|---|
| CN | 206300225 U | 7/2017 |
| EP | 2738474 A1 | 6/2014 |
| EP | 2738474 B1 | 12/2016 |
| FR | 2686400 A1 | 7/1993 |
| JP | 2010-133634 A | 6/2010 |
| JP | 2012-134029 A | 7/2012 |
| WO | 2013/014820 A1 | 1/2013 |

\* cited by examiner

HEATING COOKING APPARATUS

TECHNICAL FIELD

The present invention relates to a heating cooking apparatus.

BACKGROUND ART

PTL 1 discloses a pull-out heating cooking apparatus. The pull-out heating cooking apparatus disclosed in PTL 1 includes a heating cooking apparatus main body and a pull-out body. The heating cooking apparatus main body includes a heating cooking chamber. The pull-out body can be drawn toward the outside of the heating cooking apparatus main body from a state where the pull-out body is accommodated in the heating cooking chamber.

Heating functions of the pull-out heating cooking apparatus disclosed in PTL 1 include a microwave heating function and a rapid hot air heating function. The microwave heating function is a function of applying microwaves toward an object to be heated. A microwave radiation port is formed in a side wall of the heating cooking chamber. The rapid hot air heating function is a function of blowing out hot air from a top blow-out port and a side blow-out port toward an object to be heated. The top blow-out port is formed in a top wall of the heating cooking chamber. The side blow-out port is formed in a left side wall of the heating cooking chamber.

CITATION LIST

Patent Literature

PTL 1: JP 2010-133634 A

SUMMARY OF INVENTION

Technical Problem

Further, in recent years, there has been a demand for efficiently heating an object to be heated by conducting heat generated by a heater to the object to be heated in addition to heating the object to be heated with microwaves.

In light of the above problem, an object of the present invention is to provide a heating cooking apparatus that can efficiently heat an object to be heated by conducting heat generated by a heater to the object to be heated in addition to heating the object to be heated with microwaves.

Solution to Problem

A heating cooking apparatus of the present invention includes a heating cooking chamber, a microwave supply unit, and a first heater. The heating cooking chamber includes an accommodation space for accommodating an object to be heated. The microwave supply unit includes a radiation port and supplies microwaves from the radiation port to the heating cooking chamber. The first heater is positioned in the heating cooking chamber and heats the object to be heated. The first heater and the radiation port are positioned in a predetermined direction with respect to the accommodation space.

Advantageous Effects of Invention

According to the heating cooking apparatus of the present invention, it is possible to efficiently heat an object to be heated by conducting heat generated by a heater to the object to be heated in addition to heating the object to be heated with microwaves.

DESCRIPTION OF EMBODIMENTS

Figure 1:
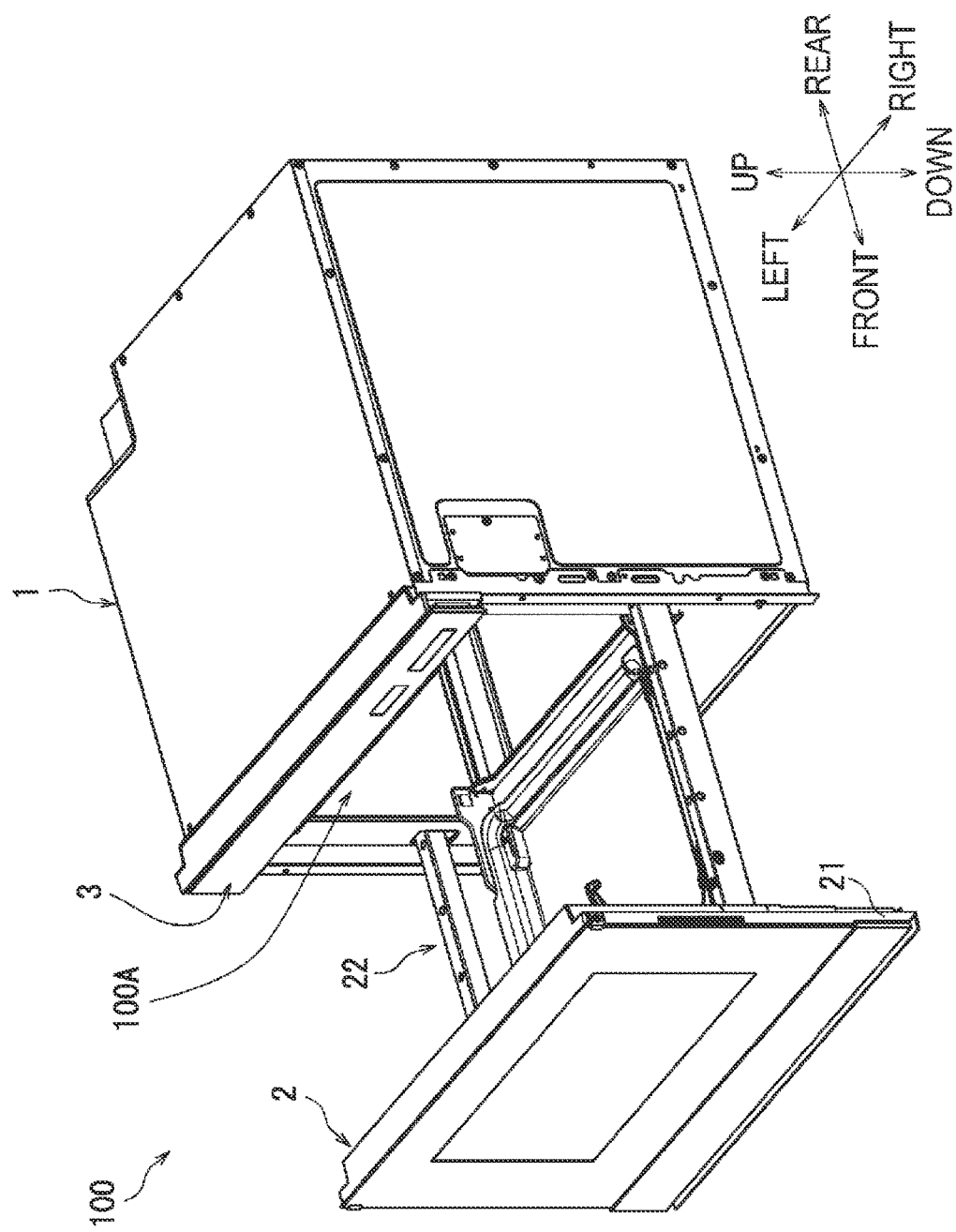
FIG. 1 is a perspective view illustrating an appearance of a pull-out heating cooking apparatus according to an embodiment of the present invention.

Hereinafter, an embodiment of a pull-out heating cooking apparatus according to the present invention will be described with reference to the drawings. In the drawings, the same or equivalent components are denoted by the same reference signs and description thereof will not be repeated.

Figure 2:
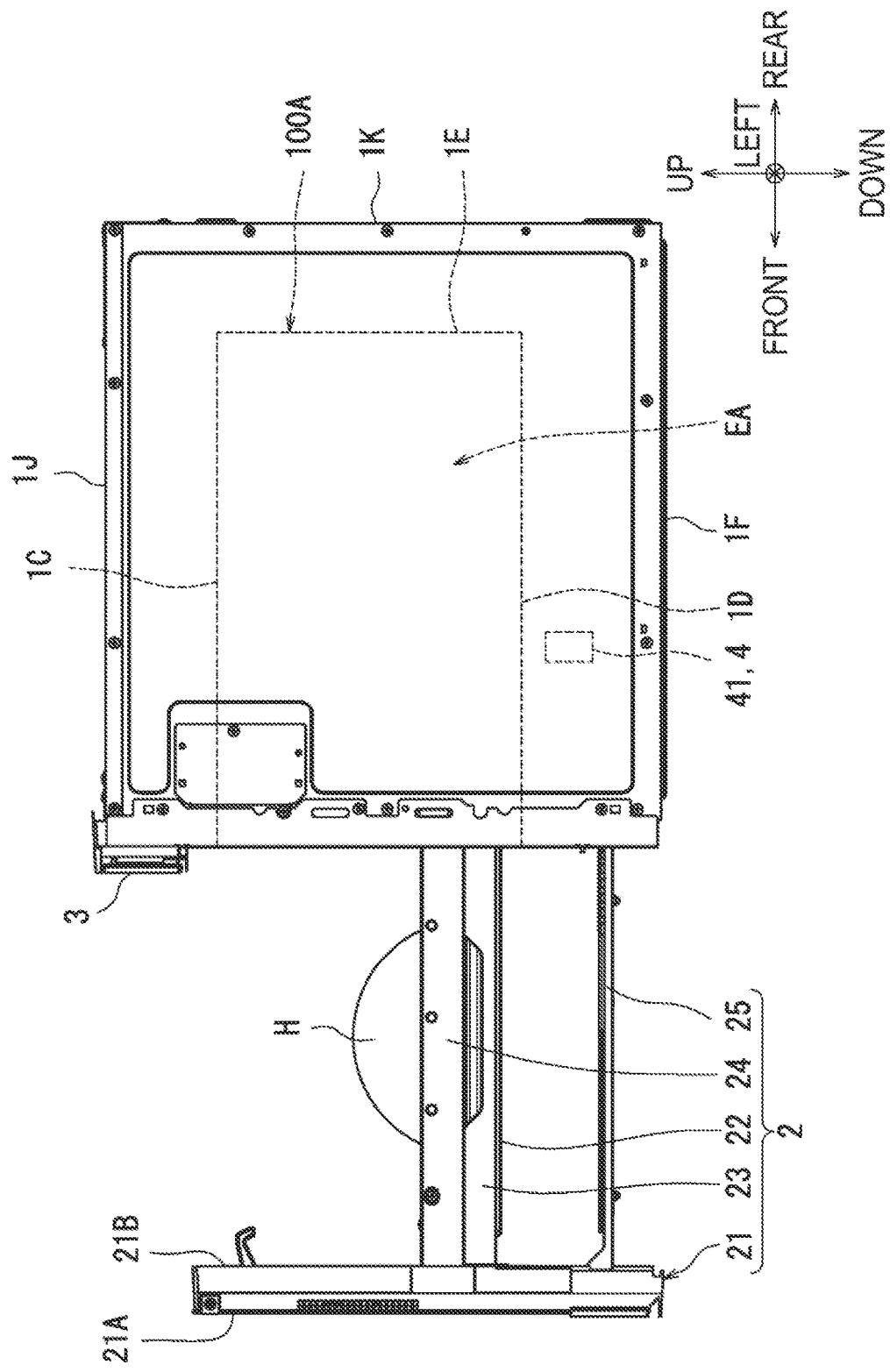
FIG. 2 is a right side view illustrating the pull-out heating cooking apparatus according to the present embodiment.
Figure 3:
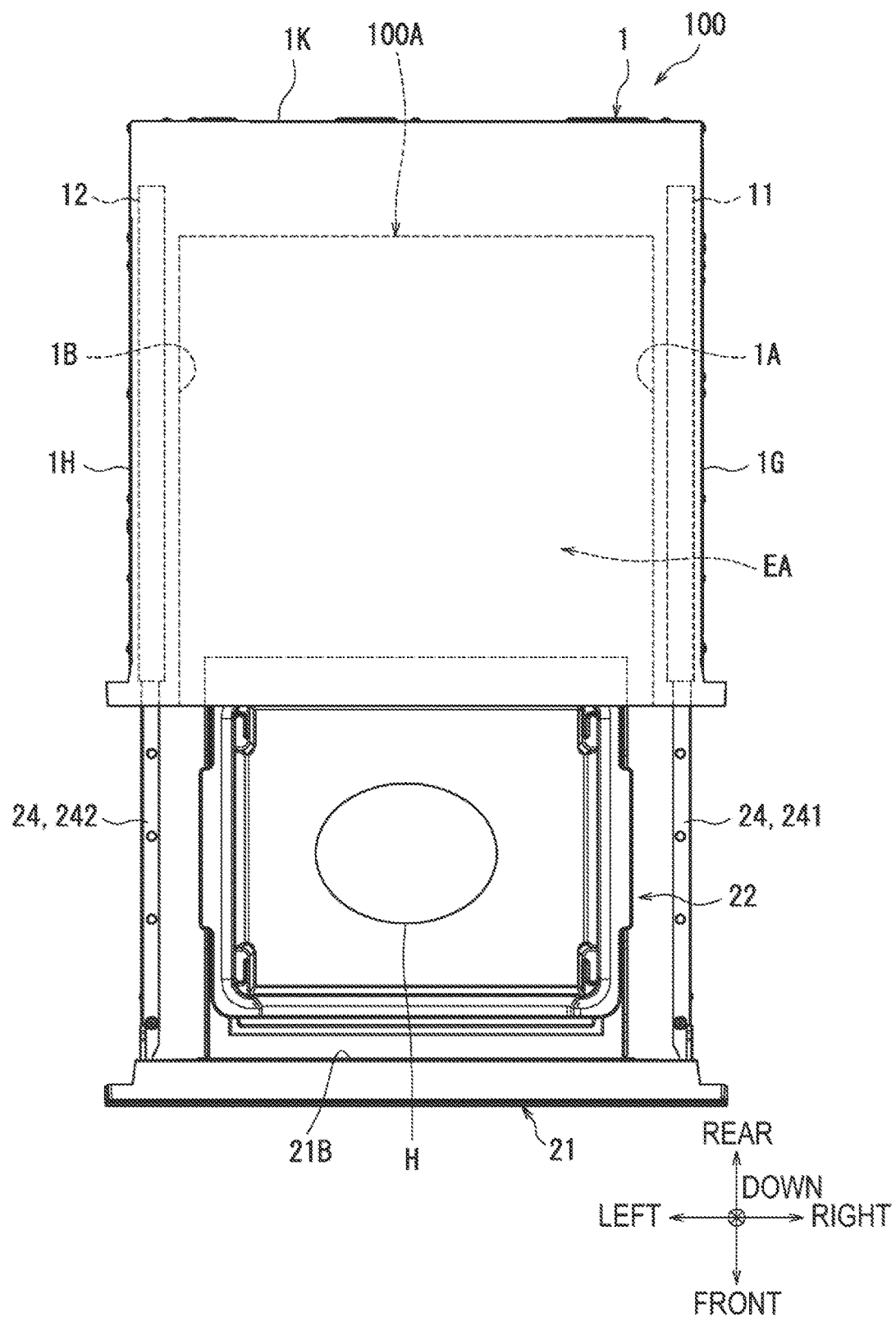
FIG. 3 is a top view illustrating the pull-out heating cooking apparatus according to the present embodiment.

A pull-out heating cooking apparatus 100 according to the present embodiment will be described with reference to FIG. 1 to FIG. 3. FIG. 1 is a perspective view illustrating an appearance of the pull-out heating cooking apparatus 100 according to the present embodiment. FIG. 2 is a right side view illustrating the pull-out heating cooking apparatus 100 according to the present embodiment. FIG. 3 is a top view illustrating the pull-out heating cooking apparatus 100 according to the present embodiment. More specifically, FIG. 1 to FIG. 3 illustrate the pull-out heating cooking apparatus 100 in a state where a pull-out body 2 is pulled out. Further, FIG. 1 illustrates the appearance of the pull-out heating cooking apparatus 100 when viewed from above obliquely from the right. The pull-out heating cooking apparatus 100 is one example of a heating cooking apparatus.

The pull-out heating cooking apparatus 100 heats and cooks an object H to be heated. The object H to be heated is, for example, a food product. As illustrated in FIG. 1, the pull-out heating cooking apparatus 100 includes a heating chamber 1, the pull-out body 2, and an operation panel 3.

In the present embodiment, a side on which the operation panel 3 of the pull-out heating cooking apparatus 100 is disposed is defined as a front side of the pull-out heating cooking apparatus 100, and a side opposite to the front side is defined as a rear side of the pull-out heating cooking apparatus 100. Further, a right side of the pull-out heating cooking apparatus 100 when the pull-out heating cooking apparatus 100 is viewed from the front side is defined as a right side, and a side opposite to the right side is defined as a left side of the pull-out heating cooking apparatus 100. Further, in a direction orthogonal to a front-rear direction and a left-right direction of the pull-out heating cooking apparatus 100, a side on which the operation panel 3 is disposed is defined as an upper side of the pull-out heating cooking apparatus 100, and a side opposite to the upper side is defined as a lower side of the pull-out heating cooking apparatus 100. Note that these orientations do not limit the orientation of the pull-out heating cooking apparatus according to the present invention when in use.

As illustrated in FIG. 1 to FIG. 3, the heating chamber 1 is a box-like member. Specifically, the heating chamber 1 includes a right outer wall 1G, a left outer wall 1H, a top outer wall 1J, a bottom outer wall 1F, and a back outer wall 1K. The heating chamber 1 also includes a heating cooking chamber 100A therein.

The heating cooking chamber 100A includes an accommodation space EA that accommodates the object H to be heated. The accommodation space EA is a space that can accommodate the object to be heated and has a predetermined capacity. Specifically, the heating cooking chamber 100A further includes a right wall 1A, a left wall 1B, a top wall 1C, a bottom wall 1D, and a back wall 1E. The shape of the heating cooking chamber 100A is, for example, a substantially rectangular parallelepiped shape. Materials of the right wall 1A, the left wall 1B, the top wall 1C, the bottom wall 1D, and the back wall 1E are, for example, a metal. The front side of the heating cooking chamber 100A is opened for allowing the object to be heated H to be inserted and removed.

The heating chamber 1 further includes a space between the bottom wall 1D and the bottom outer wall 1F. The heating chamber 1 further includes a space between the right wall 1A and the right outer wall 1G. The heating chamber 1 further includes a space between the left wall 1B and the left outer wall 1H. The heating chamber 1 further includes a space between the top wall 1C and the top outer wall 1J. The heating chamber 1 further includes a space between the back wall 1E and the back outer wall 1K.

The operation panel 3 includes an operation unit and a display portion. The operation unit receives an operation from a user. The operation unit includes various types of keys. The display portion displays various pieces of information. The display portion includes a liquid crystal panel. The operation panel 3 is located on an upper portion of a front face of the heating chamber 1.

The pull-out body 2 can be pulled out of and pushed into the heating chamber 1. Specifically, the pull-out body 2 includes a door portion 21, a placing portion 22, and a support portion 23. The door portion 21 can open and close an opening on the front side of the heating cooking chamber 100A. The door portion 21 is a substantially rectangular plate-like member. The door portion 21 includes a front face 21A and a rear face 21B. The door portion 21 opens the opening on the front side of the heating cooking chamber 100A in a state where the pull-out body 2 is pulled out of the heating cooking chamber 100A. The door portion 21 closes the opening on the front side of the heating cooking chamber 100A in a state where the pull-out body 2 is pulled into the heating cooking chamber 100A. Meanwhile, in a state where the pull-out body 2 is pushed into the heating cooking chamber 100A, a distance between the top wall 1C and the bottom wall 1D is shorter than a distance between the back wall 1E and the rear face 21B.

The object H to be heated can be placed on the placing portion 22. The placing portion 22 is, for example, a plate-like member made of ceramic or glass. The support portion 23 is fixed to the rear face 21B of the door portion 21, and supports a peripheral portion of the placing portion 22 such that the placing portion 22 is held in a horizontal state. A material of the support portion 23 includes a metal. The placing portion 22 and the support portion 23 are pulled out of the heating cooking chamber 100A to the outside by pulling out the pull-out body 2. The placing portion 22 and the support portion 23 are accommodated in the heating cooking chamber 100A in a state where the pull-out body 2 is pulled in.

The pull-out body 2 further includes a pair of slide plates 24 and a drive plate 25 in addition to the door portion 21, the support portion 23, and the placing portion 22.

The pair of slide plates 24 regulate the movement direction of the pull-out body 2 in the front-rear direction. The pair of slide plates 24 are fixed to the rear face 21B of the door portion 21.

Specifically, the pair of slide plates 24 include a right slide plate 241 and a left slide plate 242. Each of the right slide plate 241 and the left slide plate 242 is a plate-like member having the front-rear direction as a longitudinal direction. The right slide plate 241 and the left slide plate 242 oppose each other in the left-right direction. One end portion of the right slide plate 241 is attached to a right edge portion of the rear face 21B of the door portion 21. One end portion of the left slide plate 242 is attached to a left edge portion of the rear face 21B of the door portion 21.

Meanwhile, the heating chamber 1 further includes a right slide rail 11 and a left slide rail 12. The right slide rail 11 is fixed in a space between the right wall 1A and the right outer wall 1G. The left slide rail 12 is fixed in a space between the left wall 1B and the left outer wall 1H. Each of the right slide rail 11 and the left slide rail 12 is a tubular member having the front-rear direction as a longitudinal direction. The right slide plate 241 is supported to be slidable along the right slide rail 11. The left slide plate 242 is supported to be slidable along the left slide rail 12.

Further, the drive plate 25 regulates the movement direction of the pull-out body 2 in the front-rear direction. One end portion of the drive plate 25 is attached at a center portion in the left-right direction of the rear face 21B of the door portion 21 and below the placing portion 22. The drive plate 25 is a plate-like member having the front-rear direction as a longitudinal direction. The drive plate 25 includes a rack portion. The rack portion includes a plurality of teeth.

On the other hand, the heating chamber 1 further includes an opening/closing mechanism 4. The opening/closing mechanism 4 is accommodated in a space between the bottom wall 1D and the bottom outer wall 1F. For example, the opening/closing mechanism 4 includes an opening/ closing mechanism drive motor 41 and a pinion. The pinion is attached to a tip end portion of the opening/closing mechanism drive motor 41. The pinion engages with the rack portion of the drive plate 25. In addition, the drive plate 25 moves in the front-rear direction when the pinion rotates. As the drive plate 25 moves in the front-rear direction, the pair of slide plates 24 also move in the front-rear direction. As a result, the pull-out body 2 is in an open state or a closed state.

Figure 4:
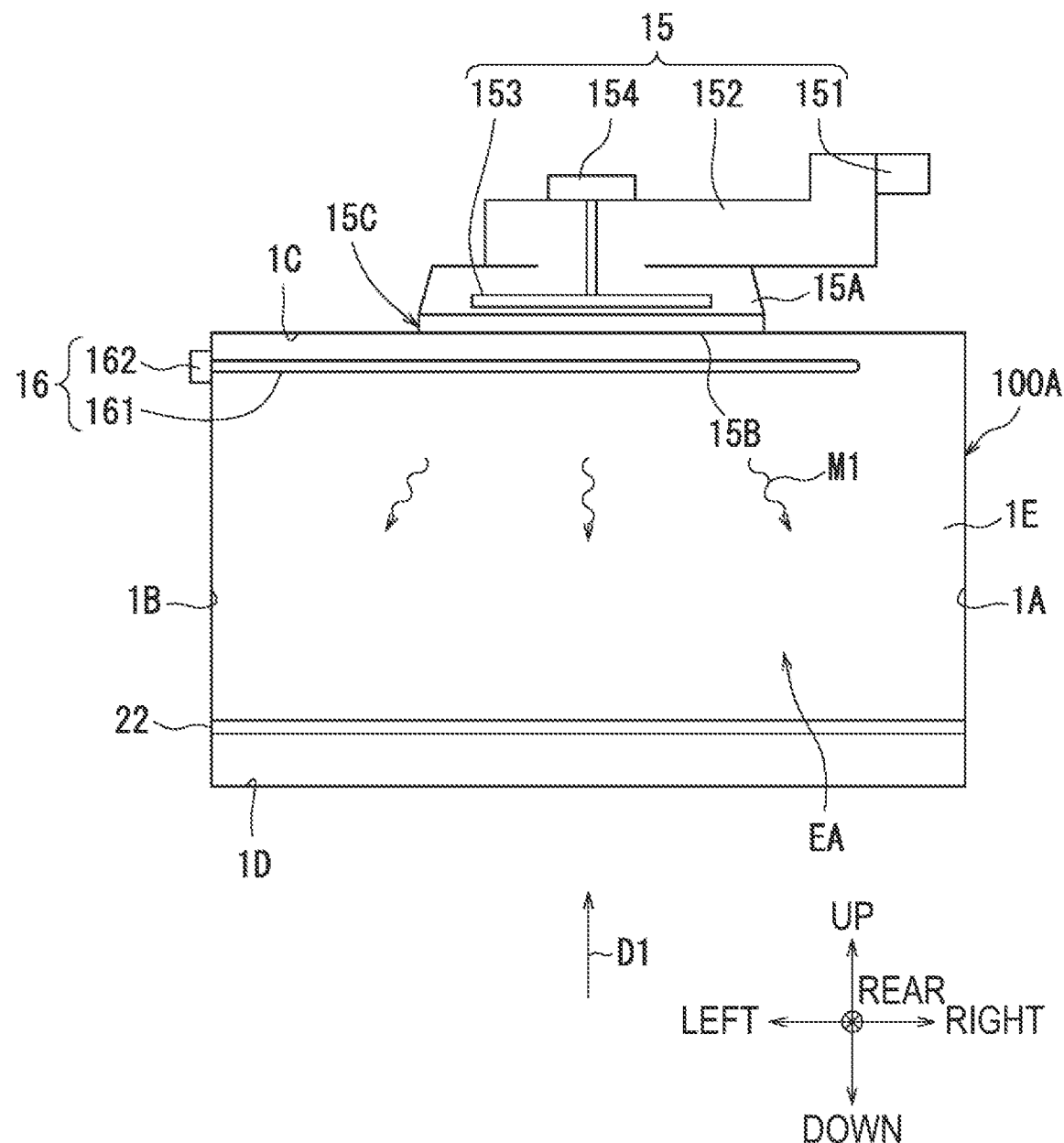
FIG. 4 is a diagram illustrating a schematic cross section of a heating cooking chamber according to the present embodiment.
Figure 5:
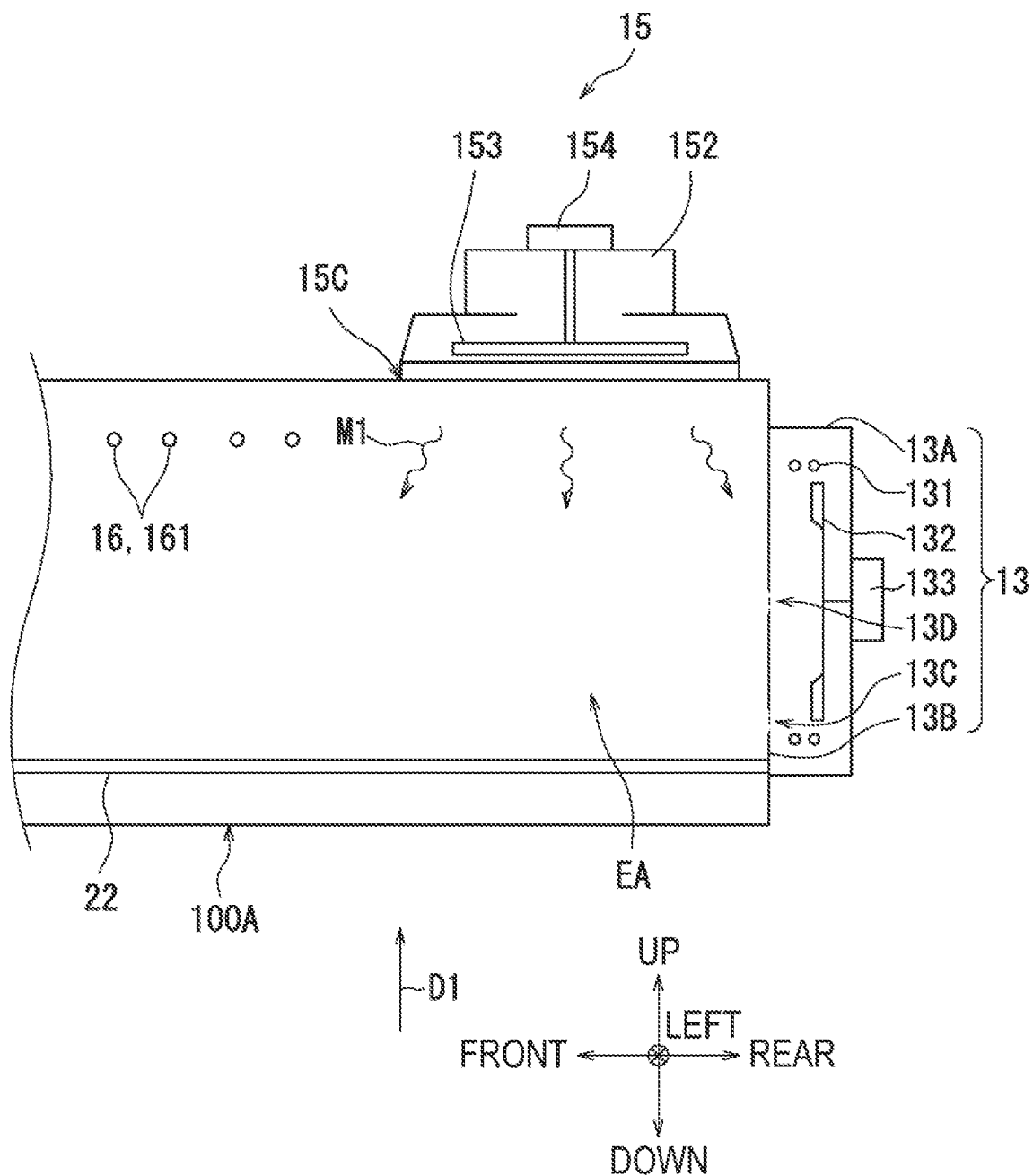
FIG. 5 is a diagram illustrating a schematic cross section of the heating cooking chamber according to the present embodiment.
Figure 6:
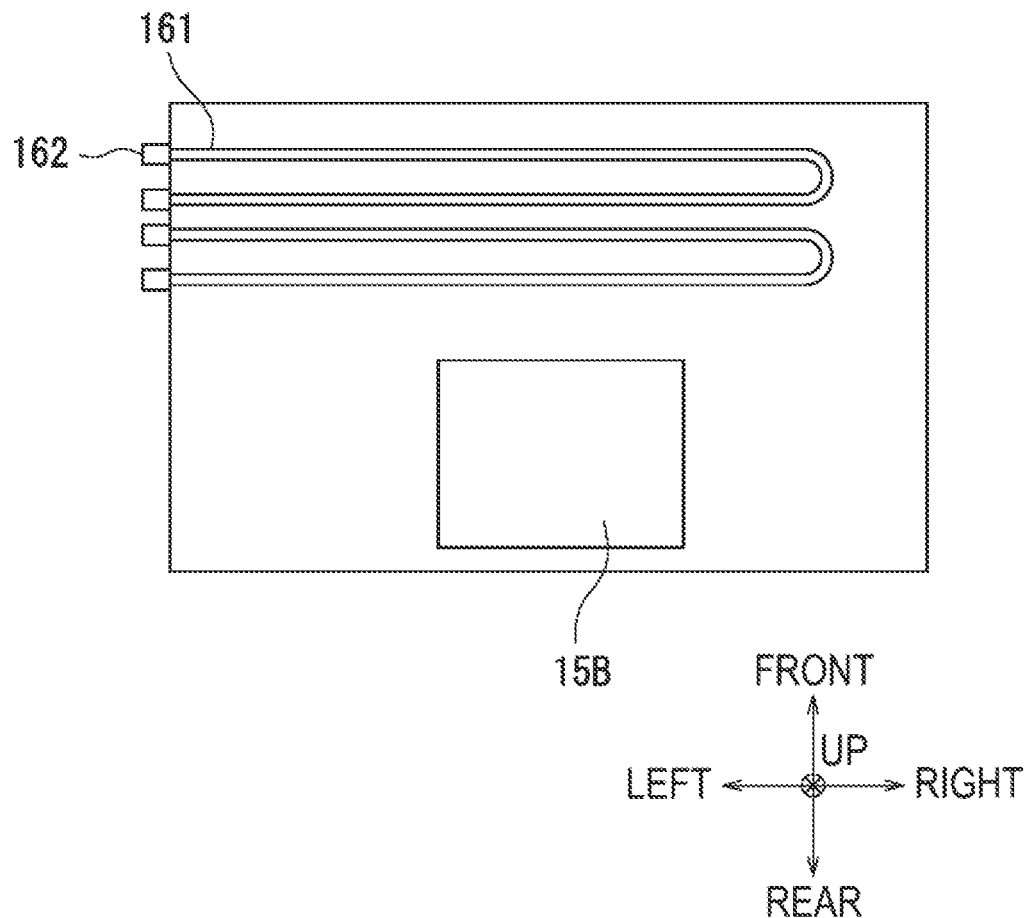
FIG. 6 is a diagram illustrating an example of a top wall of the heating cooking chamber according to the present embodiment.

Next, the heating cooking chamber 100A according to the present embodiment will be further described with reference to FIG. 1 to FIG. 6. FIG. 4 and FIG. 5 are diagrams illustrating a schematic cross section of the heating cooking chamber 100A according to the present embodiment. FIG. 6 is a diagram illustrating an example of the top wall 1C of the heating cooking chamber 100A according to the present embodiment. More specifically, FIG. 4 illustrates a cross section of the heating cooking chamber taken along a plane orthogonal to the front-rear direction. FIG. 5 illustrates a cross section of the heating cooking chamber taken along a plane orthogonal to the left-right direction.

As illustrated in FIG. 4 and FIG. 5, the pull-out heating cooking apparatus 100 further includes a microwave supply unit 15 and an oven plate 15B. The microwave supply unit 15 supplies microwaves M1 to the heating cooking chamber 100A.

The microwave supply unit 15 is positioned in a predetermined direction D1 with respect to the accommodation space EA. The predetermined direction D1 is, for example, a vertical upward direction. Specifically, the microwave supply unit 15 is positioned outside of the heating cooking chamber 100A via the top wall 1C. The microwave supply unit 15 includes a radiation chamber 15A, a magnetron 151, a waveguide 152, a rotary antenna 153, and an antenna motor 154. The magnetron 151 generates the microwaves M1. The waveguide 152 propagates the microwaves M1 generated by the magnetron 151 to the radiation chamber 15A.

The radiation chamber 15A includes a radiation port 15C. The shape of the radiation port 15C is, for example, a square shape. The radiation port 15C is disposed at a substantially center portion in the left-right direction of the top wall 1C and at a back portion in the front-rear direction. The rotary antenna 153 is accommodated in the radiation chamber 15A. The antenna motor 154 drives the rotary antenna 153. The rotary antenna 153 agitates the microwaves M1 and supplies the microwaves M1 from the radiation port 15C to the heating cooking chamber 100A.

The oven plate 15B is positioned between the radiation chamber 15A and the heating cooking chamber 100A. More specifically, the oven plate 15B is positioned in the radiation port 15C. The oven plate 15B is a plate-like member. The shape of the oven plate 15B is, for example, a square shape.

The material of the oven plate 15B includes a ceramic or glass. Because the material of the oven plate 15B includes a ceramic or glass, the oven plate 15B transmits the microwaves M1. On the other hand, the materials of the radiation chamber 15A and the waveguide 152 include a metal.

The pull-out heating cooking apparatus 100 further includes a grill unit 16. Specifically, the grill unit 16 includes a first heater 161 and an energization unit 162. The first heater 161 is positioned in the heating cooking chamber 100A and heats the object H to be heated. More specifically, the first heater 161 is positioned in the predetermined direction D1 with respect to the accommodation space EA. More specifically, the first heater 161 and the radiation port 15C are positioned at different locations when viewed from the predetermined direction D1. Specifically, the first heater 161 is positioned at an upper portion in the heating cooking chamber 100A and at a front portion in the front-rear direction. The first heater 161 has substantially a U shape when viewed from the predetermined direction D1. In the present embodiment, two grill units 16 are disposed. The first heater 161 is, for example, a sheathed heater. The energization unit 162 is positioned outside of the left wall 1B. The energization unit 162 energizes the first heater 161. The energized first heater 161 generates heat.

According to the pull-out heating cooking apparatus 100 of the present invention, the first heater 161 is provided in the predetermined direction D1 with respect to the accommodation space EA, and thus the object H to be heated can be efficiently heated by conducting heat generated by the first heater 161 to the object H to be heated from a direction opposite to the predetermined direction D1. In addition, the microwave supply unit 15 is provided in the predetermined direction D1 with respect to the accommodation space EA, and thus the object H to be heated can be efficiently heated by irradiating the object H to be heated with the microwaves M1 generated by the microwave supply unit 15 from a direction opposite to the predetermined direction D1.

In addition, because the first heater 161 and the radiation port 15C are positioned at different positions, the object H to be heated can be irradiated with the microwaves M1 from a direction opposite to the predetermined direction D1 without the microwaves being reflected by the first heater 161.

Further, because the predetermined direction D1 is a direction parallel to a vertically upward direction, heat generated by the first heater 161 can be conducted to the upper face of the object H to be heated. In addition, the upper face of the object H to be heated can be irradiated with the microwaves M1 generated by the microwave supply unit 15.

As illustrated in FIG. 5, the pull-out heating cooking apparatus 100 further includes a hot air supply unit 13. The hot air supply unit 13 supplies hot air to the heating cooking chamber 100A.

The hot air supply unit 13 is positioned outside of the heating cooking chamber 100A via the back wall 1E. More specifically, the hot air supply unit 13 includes a partitioning plate 13B, a suction hole portion 13D, a blow-out hole portion 13C, and a heating chamber 13A. The heating chamber 13A is, for example, a box-like member.

The partitioning plate 13B is positioned between the heating cooking chamber 100A and the heating chamber 13A. The partitioning plate 13B is, for example, a plate-like member made of a metal. The shape of the partitioning plate 13B is, for example, a rectangular shape. The partitioning plate 13B is disposed on substantially the entire surface of the back wall 1E.

The suction hole portion 13D is disposed in the partitioning plate 13B, and hot air inside the heating cooking chamber 100A is suctioned through the suction hole portion 13D. The blow-out hole portion 13C is disposed in the partitioning plate 13B, and hot air is blown out to the heating cooking chamber 100A through the blow-out hole portion 13C.

Specifically, the hot air supply unit 13 further includes a second heater 131, a centrifugal fan 132, and a drive unit 133.

The second heater 131 and the centrifugal fan 132 are accommodated in the heating chamber 13A. The second heater 131 heats air inside the heating chamber 13A to generate hot air. Specifically, the shape of the second heater 131 is a circular ring when viewed from the front side to the rear side. In addition, the second heater 131 is disposed along the outer circumference of the centrifugal fan 132.

The drive unit 133 is positioned outside of the heating chamber 13A. The drive unit 133 energizes the second heater 131 and drives the centrifugal fan 132. The drive unit 133 includes, for example, a motor and a power feed unit.

More specifically, the suction hole portion 13D is, for example, a set of a plurality of punched holes. Similarly, the blow-out hole portion 13C is, for example, a set of a plurality of punched holes. The punched holes each have, for example, a circular shape. The diameter of each of the punched holes of the suction hole portion 13D and the blow-out hole portion 13C is, for example, 3.4 mm. Thus, each of the suction hole portion 13D and the blow-out hole portion 13C has a small size. As a result, it is possible to prevent the microwaves M1 from leaking to the outside of the heating cooking chamber 100A.

More specifically, the blow-out hole portion 13C is disposed along the outer circumference of the partitioning plate 13B. On the other hand, the suction hole portion 13D is positioned at the center portion of the partitioning plate 13B. The set of the plurality of punched holes of the suction hole portion 13D has, for example, a circular shape.

According to the pull-out heating cooking apparatus 100 of the present invention, because the blow-out hole portion 13C is disposed along the outer circumference of the partitioning plate 13B, the inside of the heating cooking chamber 100A can be more uniformly heated.

The centrifugal fan 132 opposes the heating cooking chamber 100A through the partitioning plate 13B. The suction hole portion 13D opposes the centrifugal fan 132.

Figure 7:
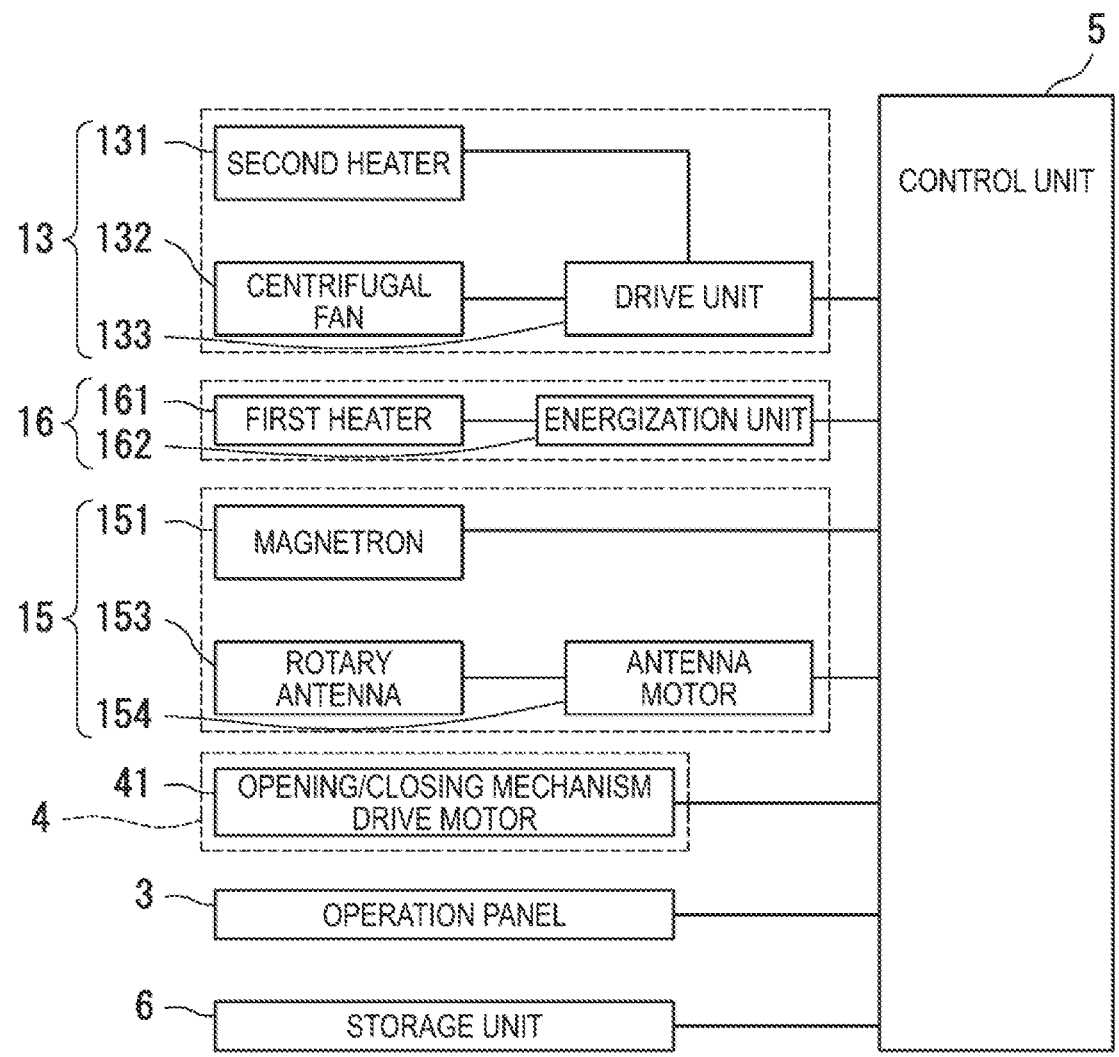
FIG. 7 is a block diagram illustrating a configuration of the pull-out heating cooking apparatus according to the present embodiment.

A configuration of the pull-out heating cooking apparatus 100 will be described in detail with reference to FIG. 7. FIG. 7 is a block diagram illustrating a configuration of the pull-out heating cooking apparatus 100 according to the present embodiment.

As illustrated in FIG. 7, the pull-out heating cooking apparatus 100 further includes a control unit 5 and a storage unit 6.

In the present embodiment, the pull-out heating cooking apparatus 100 has a "microwave heating mode," a "hot air circulation heating mode," and a "grill heating mode" as heating cooking modes. The "microwave heating mode" is mainly a mode in which the object H to be heated is heated and cooked through radiation of the microwaves M1 inside the heating cooking chamber 100A. The "hot air circulation heating mode" is mainly a mode in which the object H to be heated is heated and cooked by circulating hot air in the heating cooking chamber 100A to make the temperature in the heating cooking chamber 100A uniform. The "grill heating mode" is mainly a mode in which the object H to be heated is heated and cooked by transmitting heat generated by the first heater 161 to the object H to be heated.

The control unit 5 is a hardware circuit that includes a processor such as a central processing unit (CPU). The control unit 5 controls the drive unit 133, the magnetron 151, the antenna motor 154, the energization unit 162, the opening/closing mechanism drive motor 41, the operation panel 3, and the storage unit 6 by executing control programs stored in the storage unit 6.

More specifically, the control unit 5 controls the driving of the microwave supply unit 15, the driving of the grill unit 16, and the driving of the hot air supply unit 13. For example, in a case where the "microwave heating mode" is selected, the magnetron 151 and the antenna motor 154 are driven. Additionally, in a case where the "grill heating mode" is selected, the energization unit 162 is energized.

Further, in a case where the "hot air circulation heating mode" is selected, the drive unit 133 is driven. Specifically, the drive unit 133 energizes the second heater 131 and drives the centrifugal fan 132.

The storage unit 6 includes a random access memory (RAM) and a read only memory (ROM). The storage unit 6 stores control programs used for controlling operations of each part of the pull-out heating cooking apparatus 100. The storage unit 6 stores setting information input when the operation panel 3 is operated.

Figure 8:
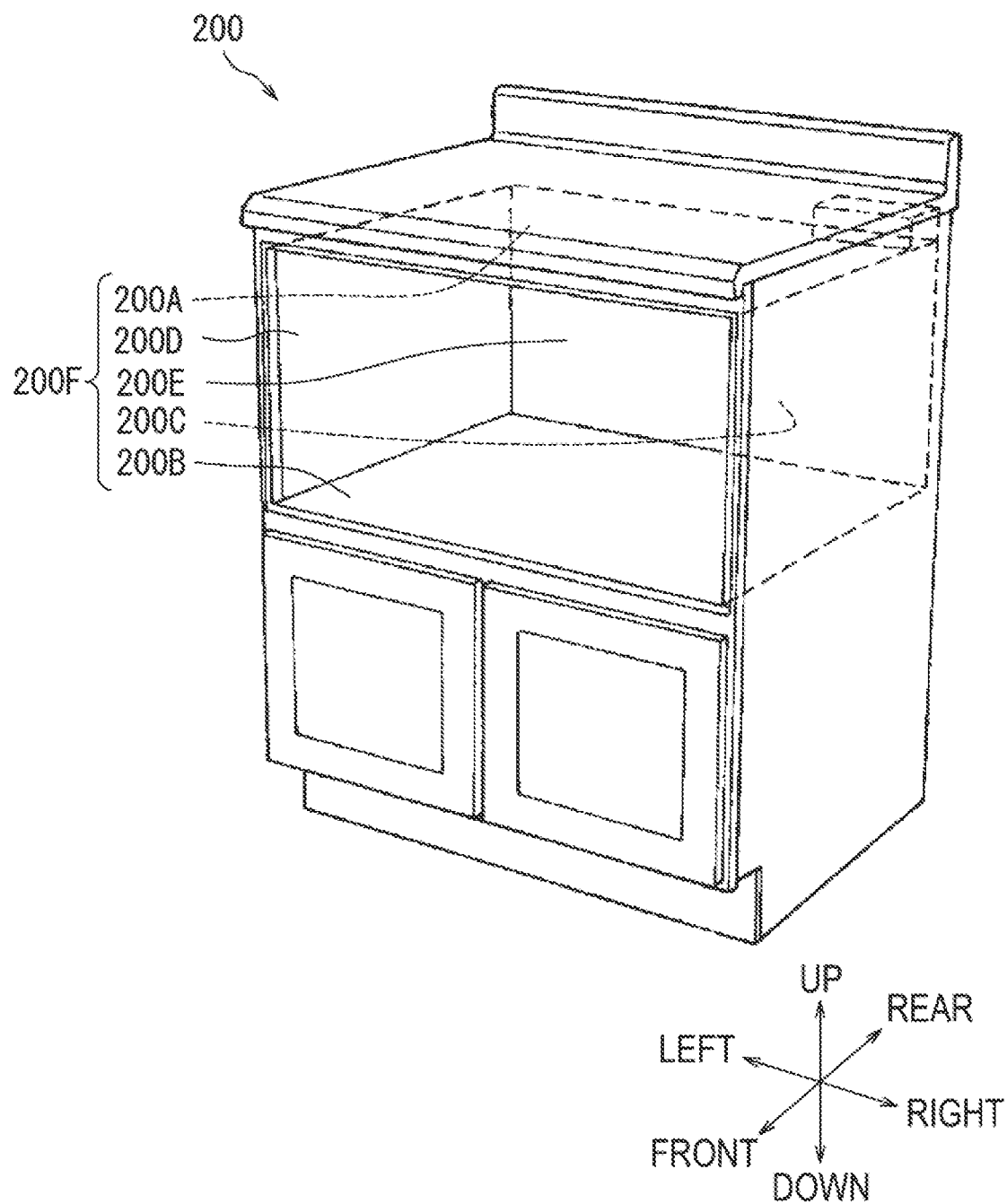
FIG. 8 is a perspective view illustrating an appearance of a cabinet to which the pull-out heating cooking apparatus according to the present embodiment is attached.

Subsequently, a cabinet 200 to which the pull-out heating cooking apparatus 100 is attached will be described with reference to FIG. 8. FIG. 8 is a diagram illustrating an appearance of the cabinet 200 to which the pull-out heating cooking apparatus 100 according to the present embodiment is attached.

The pull-out heating cooking apparatus 100 is installed in the cabinet 200 in built-in manner. As illustrated in FIG. 8, the cabinet 200 includes an upper wall 200A, a lower wall 200B, a right wall 200C, a left wall 200D, and a rear wall 200E. The upper wall 200A, the lower wall 200B, the right wall 200C, the left wall 200D, and the rear wall 200E form an accommodation portion 200F. The accommodation portion 200F is a rectangular parallelepiped space in which the pull-out heating cooking apparatus 100 is attached.

An embodiment of the present invention has been described with reference to the drawings (FIG. 1 to FIG. 8). However, the present invention is not limited to the embodiment described above, and the present invention can be implemented in various modes without departing from the gist of the disclosure. The drawings primarily schematically illustrate each of the constituent elements for the sake of easier understanding, and the thickness, length, quantity, and the like of each of the illustrated constituent elements are different from the actual thickness, length, quantity, and the like by reason of creation of the drawings. The material, shape, dimensions, and the like of each of the constituent elements illustrated in the embodiment described above are merely exemplary and are not particularly limiting, and various modifications can be made within the scope not departing from the effects of the present invention in essence.

Figure 9:
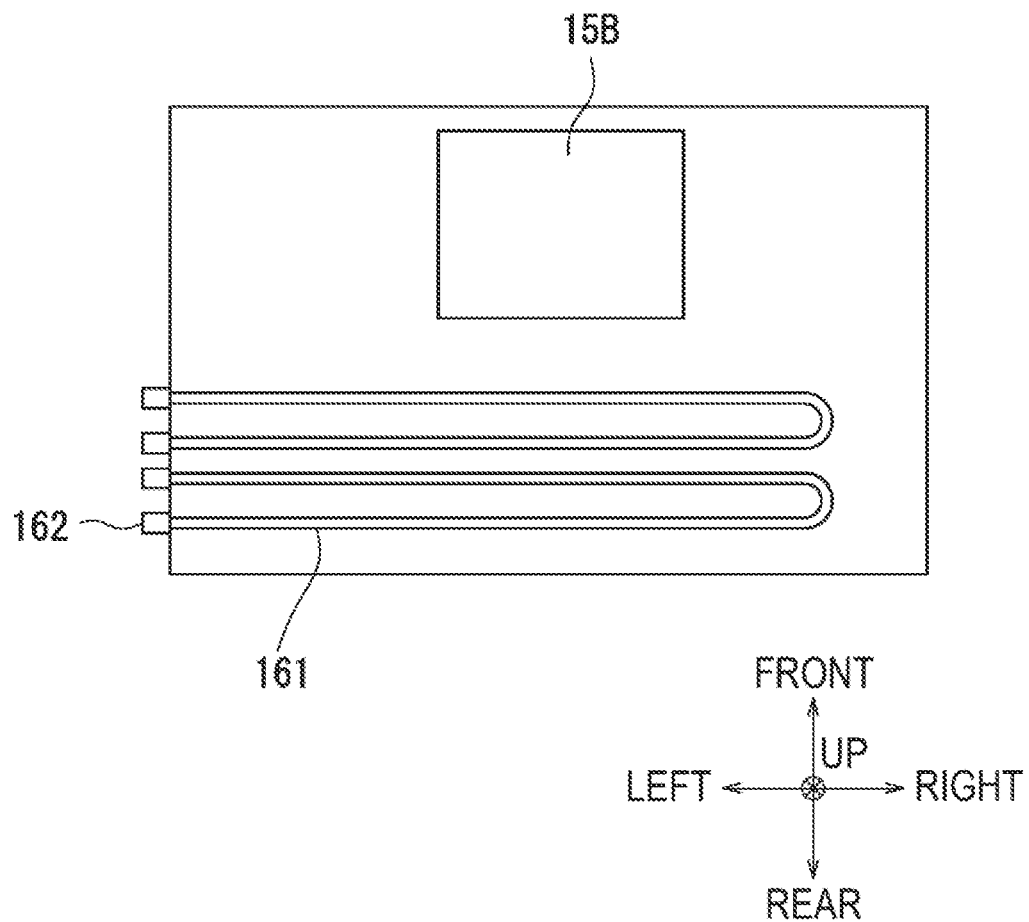
FIG. 9 is a diagram illustrating another example of a top wall of the heating cooking chamber according to the present embodiment.

(1) As described with reference to FIG. 1 to FIG. 8, in the pull-out heating cooking apparatus 100, the radiation port 15C is disposed at a rear portion of the top wall 1C in the front-rear direction, and the first heater 161 is positioned at a front portion in the heating cooking chamber 100A, but the present invention is not limited thereto. FIG. 9 is a diagram illustrating another example of the top wall 1C of the heating cooking chamber 100A according to the present embodiment. As illustrated in FIG. 9, the radiation port 15C may be disposed at a front portion of the top wall 1C in the front-rear direction, and the first heater 161 may be positioned at a rear portion of the heating cooking chamber 100A.

Figure 10:
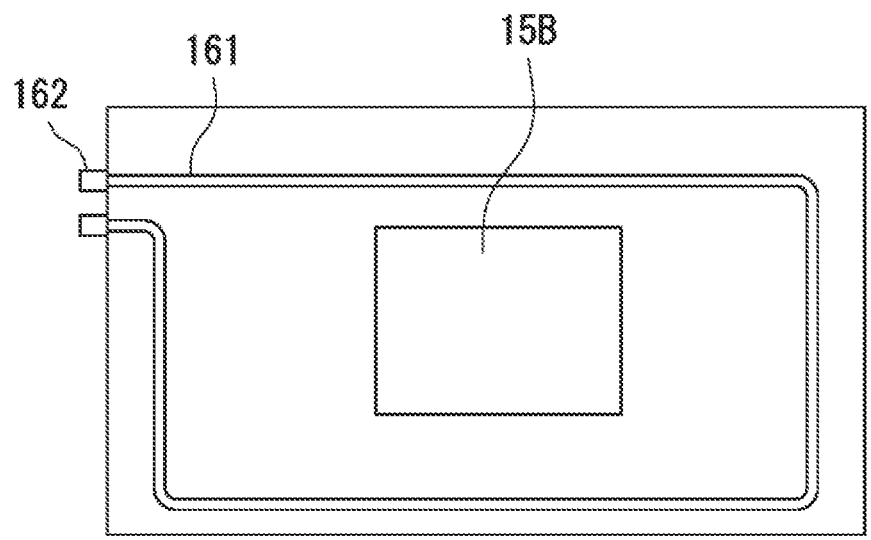
FIG. 10 is a diagram illustrating still another example of a top wall of the heating cooking chamber according to the present embodiment.
Figure 10:
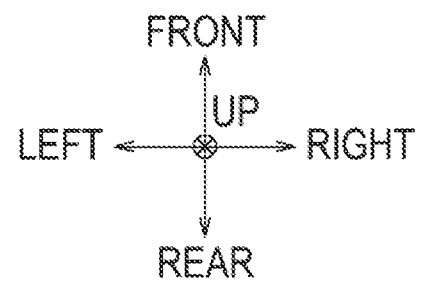

In addition, FIG. 10 is a diagram illustrating still another example of the top wall 1C of the heating cooking chamber 100A according to the present embodiment. As illustrated in FIG. 10, the first heater 161 is disposed surrounding the radiation port 15C. Specifically, the radiation port 15C may be disposed at substantially the center portion of the top wall 1C, and the first heater 161 may be positioned at an upper peripheral portion in the heating cooking chamber 100A.

Figure 11:
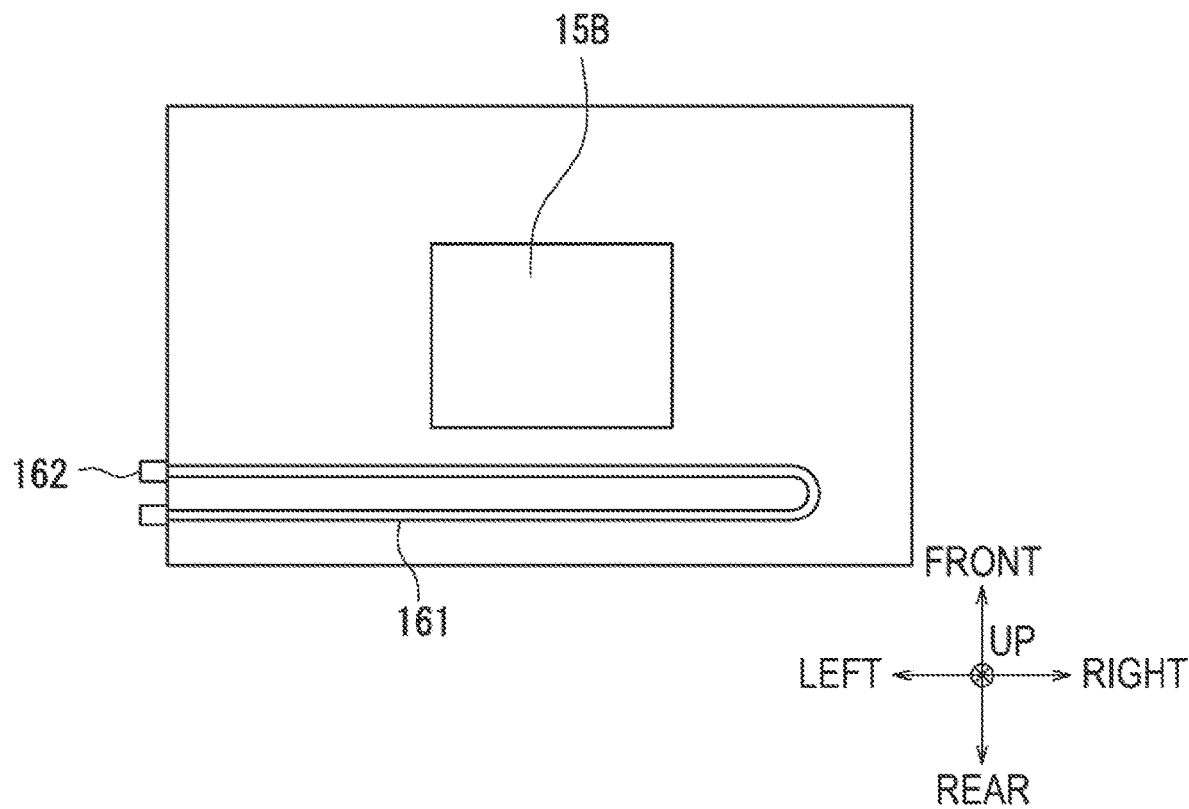
FIG. 11 is a diagram illustrating still another example of a top wall of the heating cooking chamber according to the present embodiment.

FIG. 11 is a diagram illustrating still another example of the top wall 1C of the heating cooking chamber 100A according to the present embodiment. As illustrated in FIG. 11, the radiation port 15C may be disposed at substantially the center portion of the top wall 1C, and the first heater 161 may be positioned at a rear portion in the heating cooking chamber 100A.

Figure 12:
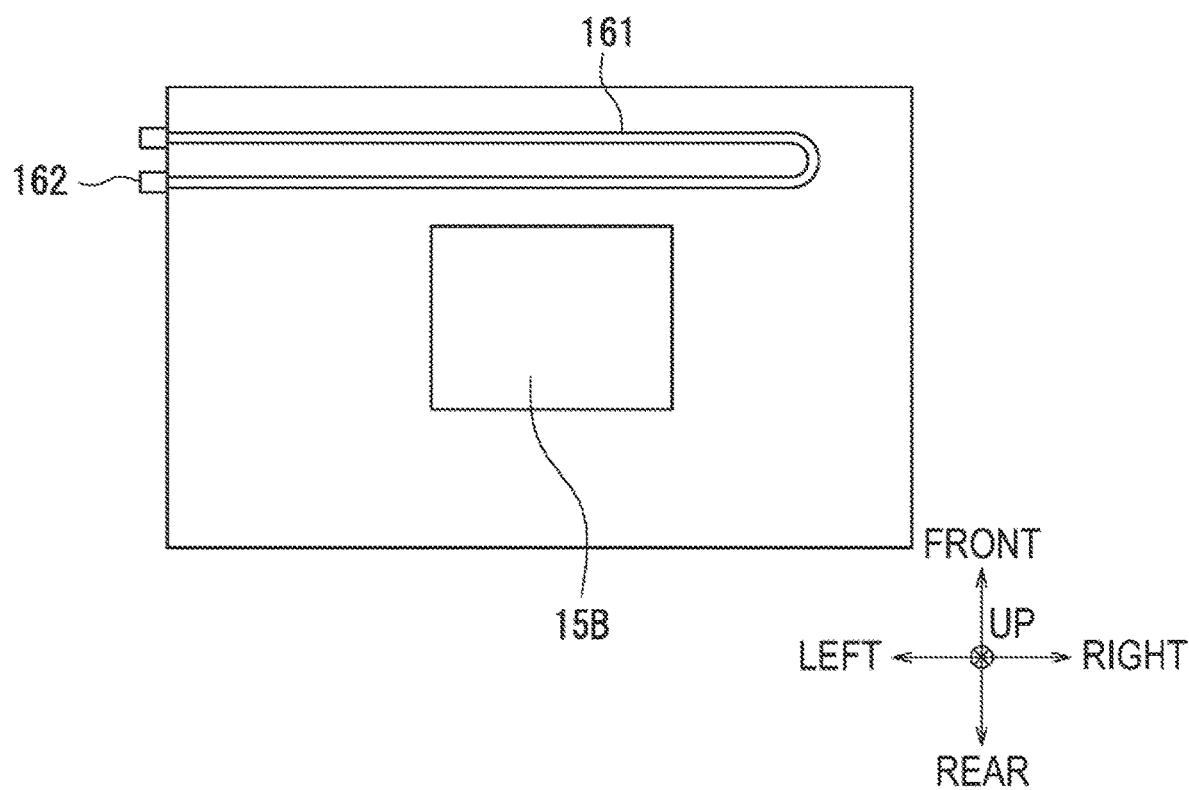
FIG. 12 is a diagram illustrating still another example of a top wall of the heating cooking chamber according to the present embodiment.

FIG. 12 is a diagram illustrating still another example of the top wall 1C of the heating cooking chamber 100A according to the present embodiment. As illustrated in FIG. 12, the radiation port 15C may be disposed at substantially the center portion of the top wall 1C, and the first heater 161 may be positioned at a front portion in the heating cooking chamber 100A.

Figure 13:
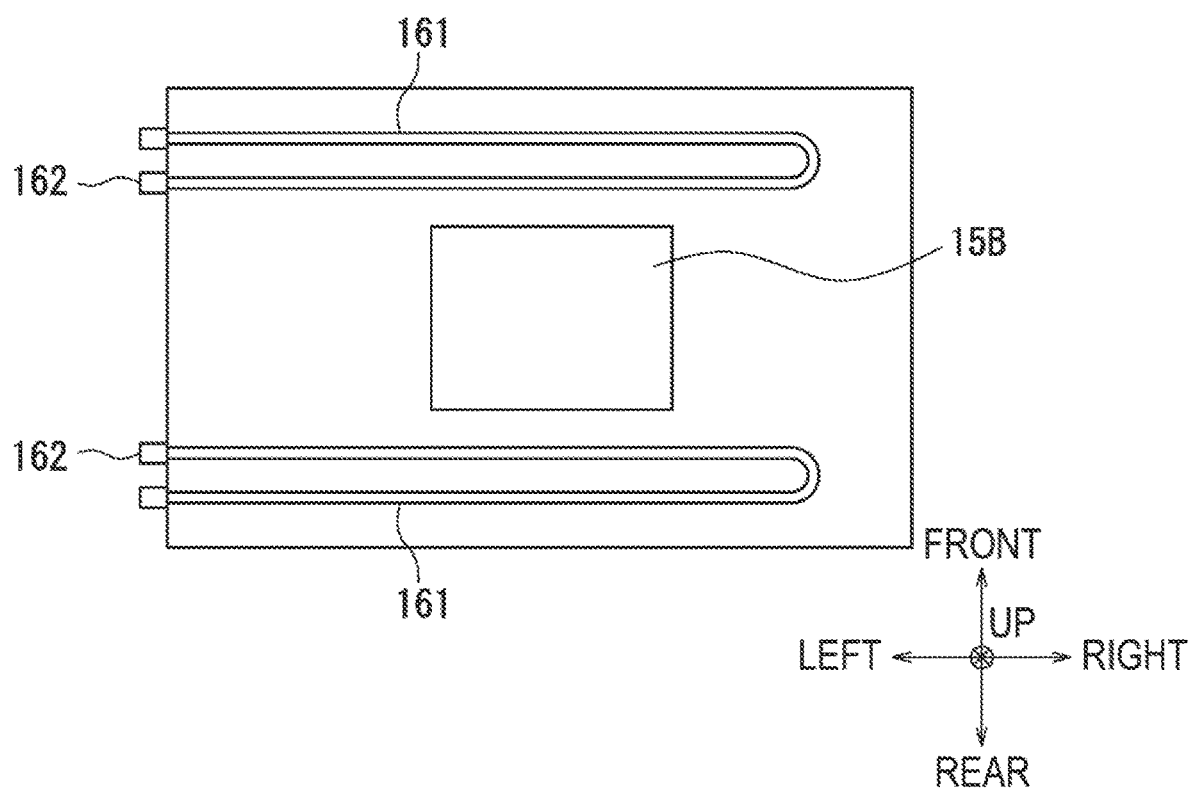
FIG. 13 is a diagram illustrating still another example of a top wall of the heating cooking chamber according to the present embodiment.

FIG. 13 is a diagram illustrating still another example of the top wall 1C of the heating cooking chamber 100A according to the present embodiment. As illustrated in FIG. 13, the radiation port 15C may be disposed at substantially the center portion of the top wall 1C, and the first heater 161 may be positioned at a front portion and a rear portion in the heating cooking chamber 100A.

Figure 14:
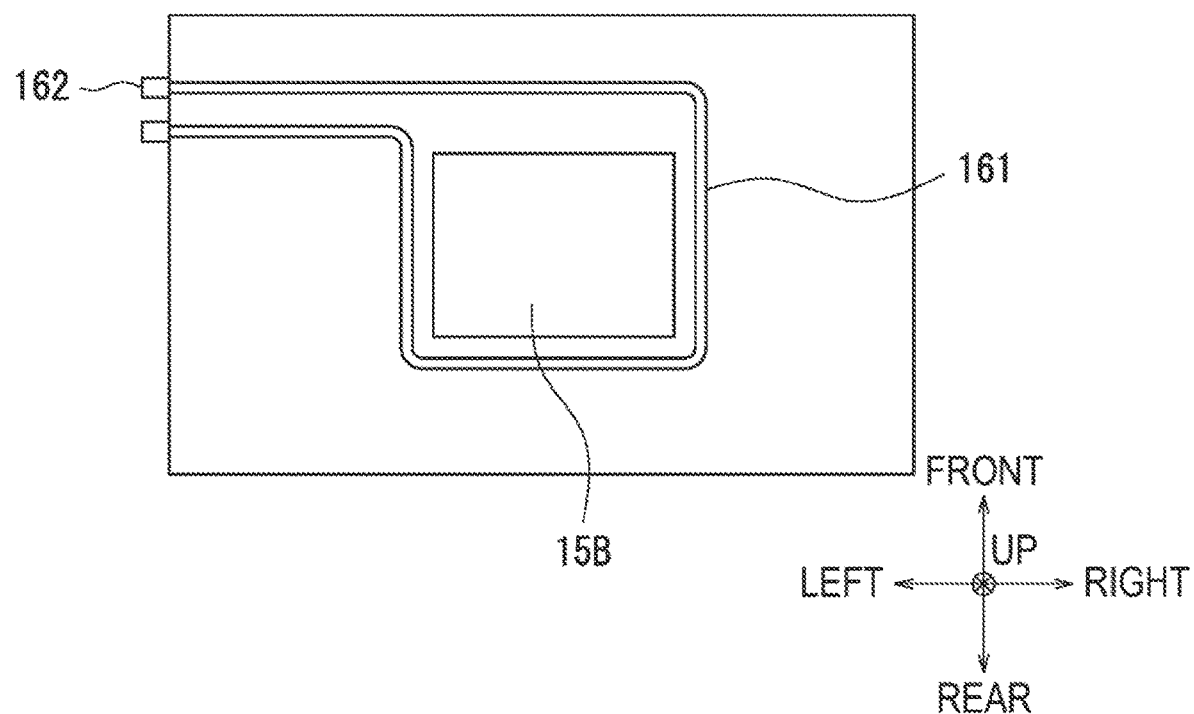
FIG. 14 is a diagram illustrating still another example of a top wall of the heating cooking chamber according to the present embodiment.

FIG. 14 is a diagram illustrating still another example of the top wall 1C of the heating cooking chamber 100A according to the present embodiment. As illustrated in FIG. 14, the first heater 161 is disposed surrounding the radiation port 15C. Specifically, the radiation port 15C may be disposed at substantially the center portion of the top wall 1C, and the first heater 161 may be positioned at a peripheral portion of the center portion in the heating cooking chamber 100A.

(2) As described with reference to FIG. 1 to FIG. 14, the pull-out heating cooking apparatus 100 includes the hot air supply unit 13, but the present invention is not limited thereto. For example, the pull-out heating cooking apparatus 100 may further include a hot air supply unit different from the hot air supply unit 13.

(3) As described with reference to FIG. 1 to FIG. 14, each of the blow-out hole portion 13C and the suction hole portion 13D is a set of a plurality of punched holes, but the present invention is not limited thereto. For example, each of the blow-out hole portion 13C and the suction hole portion 13D may be one opening portion, may be a plurality of slit holes, or may be a net-like portion.

(4) As described with reference to FIG. 1 to FIG. 14, the pull-out heating cooking apparatus 100 includes the pull-out body 2, but the present invention is not limited thereto. For example, the pull-out heating cooking apparatus 100 may include a rotary table on the bottom wall 1D without including the pull-out body 2.

INDUSTRIAL APPLICABILITY

The present invention is useful in the field of a heating cooking apparatus, for example.

REFERENCE SIGNS LIST

13 Hot air supply unit
13A Heating chamber
13B Partitioning plate
13C Blow-out hole portion
13D Suction hole portion
131 Second heater
132 Centrifugal fan
15 Microwave supply unit
100 Pull-out heating cooking apparatus
100A Heating cooking chamber
161 First heater
D1 Predetermined direction
EA Accommodation space

The invention claimed is:

1. A pull-out heating cooking apparatus comprising:
a heating cooking chamber including an accommodation space for accommodating an object to be heated;
a microwave supply unit including a radiation chamber and a radiation port, and configured to supply microwaves from the radiation port to the heating cooking chamber;
a first heater positioned in the heating cooking chamber and configured to heat the object to be heated;
an oven plate, positioned between the radiation chamber and the heating cooking chamber, configured to transmit the microwaves; and
a pull-out body capable of being pulled out in a front-rear direction with respect to the heating cooking chamber,
wherein the first heater and the radiation port are positioned in a predetermined direction with respect to the accommodation space,
the radiation port is disposed at a back portion in the front-rear direction of a top wall of the heating cooking chamber, and
the first heater is positioned at an upper portion in the heating cooking chamber and at a front portion in the front-rear direction.

* * * * *